United States Patent [19]

Higuchi et al.

[11] Patent Number: 5,161,252
[45] Date of Patent: Nov. 3, 1992

[54] DIVERSITY ANTENNA COMMUNICATION SYSTEM

[75] Inventors: Harukazu Higuchi; Yoshizo Shibano, both of Osaka, Japan

[73] Assignee: Sumitomo Electric Industries, Ltd., Osaka, Japan

[21] Appl. No.: 375,669

[22] Filed: Jul. 5, 1989

[30] Foreign Application Priority Data

Jul. 6, 1988 [JP] Japan .................. 63-168573
Aug. 10, 1988 [JP] Japan ............... 63-105581[U]
Dec. 23, 1988 [JP] Japan .................. 63-327041

[51] Int. Cl.⁵ .............. H04B 1/44; H04B 17/02; H04B 1/06
[52] U.S. Cl. ............................ 455/78; 455/134; 455/277.1
[58] Field of Search ............ 455/134, 135, 140, 63, 455/277, 133, 78, 136, 100, 101

[56] References Cited

U.S. PATENT DOCUMENTS 4,035,728 7/1977 Ishikawa et al. ............ 455/134
4,756,023 7/1988 Kojima ....................... 455/134

FOREIGN PATENT DOCUMENTS 0124319 11/1984 European Pat. Off.
0167133 9/1984 Japan ........................... 455/133
59-178830 10/1984 Japan.
1000606 8/1965 United Kingdom.

OTHER PUBLICATIONS

I. Yashima et al., "Development of the TV Receiver for Cars", IEEE Transactions on Consumer Electronics, vol. CE-28, No. 3, Aug. 1982, New York, pp. 437–445.
K. Suwa et al., "Diversity Improvement of Voice Signal Transmission Using Postdetection Selection Combining in Land Mobile Radio", IEEE Transactions on Vehicular Technology, vol. VT-33, No. 3, Aug. 1984, New York.

Primary Examiner—Curtis Kuntz
Assistant Examiner—Christine K. Belzer
Attorney, Agent, or Firm—Cushman, Darby & Cushman

[57] ABSTRACT

A diversity antenna communication system for mounting on and use with a mobile body. The system includes at least two receiving systems having different propagation paths from one another. During the transmission, a radio wave including receiving system change-over timing signals therein is radiated. Upon reception, the change-over timing signals are extracted to control reception.

21 Claims, 10 Drawing Sheets

DIVERSITY ANTENNA COMMUNICATION SYSTEM

BACKGROUND OF THE INVENTION

1. Field of the Invention

The present invention relates to a diversity antenna communication system to be mounted on and used in conjunction with a mobile body. More specifically, the invention relates to a diversity antenna communication system having two or more receiving or transmitting systems with different propagation paths from one another in which a received signal from one of the receiving systems having a higher reception level than another is selected for use to reduce influences of deep fading.

2. Description of Prior Art

In a signal communication between mobile bodies (mobile stations) which is carried out mainly with radiowaves modulated with digital data, a propagation path on the ground is a multipass type propagation path, and therefore the envelope and phase of a radio wave fluctuate randomly in accordance with the Rayleigh's distribution law and the uniform distribution law, respectively, (i.e., the radio wave suffers from fading). In order to reduce such fading, there is a diversity receiving antenna communication system in which the receiving system is changed over from one receiving antenna to another.

Conventional diversity receiving antenna communication systems are used primarily on a mobile body, and, for example, diversity systems using space, polarization, arrival angles, time and frequency have been utilized. Of those systems, a diversity receiving antenna communication system using an arrival angle is best suited for being mounted on a ground mobile station (such as a vehicle, or the like) because of its compactness and its ability to reduce fading in a mobile body which remarkably changes a traveling direction thereof.

A diversity signal receiving apparatus employed in the above-described diversity antenna communication system is as shown in FIG. 1. That is, two signal receiving antennas 1' provided for different signal propagation paths are connected to two distributors 2', respectively. One of the distributors 2' is connected to a signal receiver 3' and to a level monitor circuit 5'; whereas the other distributor 2' is connected to another level monitor circuit 5' and to a dummy resistor 4' equivalent in impedance to the signal receiver 3'. The two level monitor circuits 5' are connected to a level comparison circuit 6'.

The distributors 2' operate to distribute signals received through the receiving antennas 1' to loads (the receiver 3' and the dummy resistor 4') and to the level monitor circuits 5', respectively. The level monitor circuits 5' monitor the levels of the signal received through the distributors 2' (hereinafter referred to as "reception levels", when applicable). The level comparison circuit 6' compares the reception levels monitored by the level monitor circuits 5' with each other for detection of the reversal of the reception levels, so that in the signal receiving system providing a higher reception level the distributor is connected to the receiver, and in the preceding signal receiving system the distributor is connected to the dummy resistor.

FIG. 2 is a diagram for explaining reception levels in the conventional diversity signal receiving apparatus, and its antenna switching timing. More specifically, FIG. 2(A) shows an electric field strength at a signal receiving point, FIG. 2(B) shows the antenna switching timing, and FIG. 2(C) shows relationship between received data blocks and the antenna switching timing.

The two signal receiving antennas receive a radio wave from a signal transmitting station, to provided two reception levels (indicated by the thin solid line (a) and the broken line (b) in FIG. 2(A)). When the reception levels are reversed (as indicated by the broken line (d) in FIG. 2(B)), the signal receiving antenna selected previously is switched over to the receiving antenna providing the highest reception level, which provides a diversity field strength (as indicated by the heavy solid line (c) in FIG. 2(A)).

Thus, the signal can be received through the signal receiving system providing the highest reception level at all times. Therefore, the effect of deep fading can be minimized.

However, when the communication system switches one receiving antenna to the other, the phases before and after the change-over action are not continuous because of the difference in propagation paths. Further, although data which are divided into blocks of data signals, such as a synchronizing word, a control word, a talking word, and so on are transmitted continuously, the continuity of data, and moreover, the data itself are lost at the time of the change-over action as shown in FIG. 2(C). Therefore, to provide the lost data, it is necessary to retransmit.

In addition, in the case where the difference in level between the input signals received by the signal receiving system are small, the frequency of switching the signal receiving systems is increased, and accordingly the probability that the data is lost by the switching of the signal receiving systems is increased.

This disadvantage will be described in detail with reference to FIG. 3. In the case where the difference in level between the input (indicated by the solid line in FIG. 3(A)) received by a signal receiving system A and that (indicated by the broken line in FIG. 3(A)) received by a signal receiving system B is small (hereinafter referred to as "having substantially the same level", when applicable), the frequency of reversal of the reception levels is increased. A reception level determining unit detects such a frequent level reversal to output a signal receiving system switching signals (as shown in FIGS. 3(B) and 3(C)). Thus, the signal receiving systems are frequently switched over to each other, with the result that the data is cut and lost during the switching operation.

Furthermore, there is a problem that data transmitted by a mobile body is not transmitted to the called station. In order to transmit signals from a mobile body, a non-directional mono-pole antenna is used. With the non-directional antenna, data is not transmitted at some times because the position of the mobile body is changed frequently and therefore the reception level transmitted from the called station changes frequently.

For a single communication, signals are transmitted and received between fixed stations through directional diversity antennas. This is to separate an aimed station from a plurality of stations, thereby to perform selective communications.

SUMMARY OF THE INVENTION

The object of the present invention is to provide a diversity receiving antenna communication system for preventing a possibility of data loss at the switching of signal receiving systems, and minimizing the failure that data is not transmitted to a called station.

The foregoing object of the invention has been achieved by the provision of the following systems and apparatuses:

In the diversity antenna communication system according to a first aspect of the present invention, a transmission side transmits a radio wave having plural receiving system change-over timing signals inserted at the regions other than those for the data, and a reception side including plural receiving systems receives the radio wave, extracts the receiving system change-over timing signals and produces a change-over signal in response to the extracted receiving system change-over timing signals to switch one receiving system to another receiving system providing reception signals of maximum (high) level. As a result, a maximum reception level can be obtained with little loss of data because the receiving system change-over action occurs in the other periods than those for data region.

A diversity signal receiving apparatus, according to a second aspect of the invention, comprises: reception level setting means for setting the signal reception level of one of at least two signal receiving systems which is not used for actual signal reception to a lower level than the signal reception level of the signal receiving system which is used for the actual signal reception, to the extent that deep fading can be detected; signal receiving system detecting means for comparing the signal reception levels of at least two signal receiving systems whose signal reception levels have been set by the reception level setting means and detecting the signal receiving system highest in signal reception level; and signal receiving system change-over means for switching the present signal receiving system over to the signal receiving system which is highest in signal reception level.

A diversity signal receiving apparatus, according to a third aspect of the invention, comprises: signal receiving system detecting means for comparing the signal reception levels of at least two signal receiving systems and detecting the alternation in highest signal reception level of the signal receiving systems; and signal receiving system change-over means for setting the upper threshold value and the lower threshold value for a signal reception level at the alternation in highest signal reception level of the signal receiving systems to the extent that the deep fading can be detected and switching the present signal receiving system over to the signal receiving system highest in signal reception level when the signal reception level of the present signal receiving system which is used for the actual signal reception becomes lower than the lower threshold value and the signal reception level of a signal receiving system which is highest in signal reception level exceeds the upper threshold value.

In a diversity antenna communication system, according to a fourth aspect of the invention, the signal receiving system highest in signal reception level which has been selected in the system provided according to the first aspect of the invention or in the apparatus provided according to the second or third aspect of the invention is connected to a transmitter, so that signal transmission is carried out with the antenna in the signal receiving system highest in signal reception level.

In a diversity antenna communication system, according to a fifth aspect of the invention, a signal receiving system providing the lowest level in signal reception level of at least two signal receiving systems is interrupted, and the antennas in the remaining signal receiving systems are used for signal transmission and reception.

DETAILED DESCRIPTION OF THE PREFERRED EMBODIMENT

A preferred embodiment of the diversity receiving antenna communication system according to the present invention will be described in detail with reference to the accompanying drawings.

Figure 1:
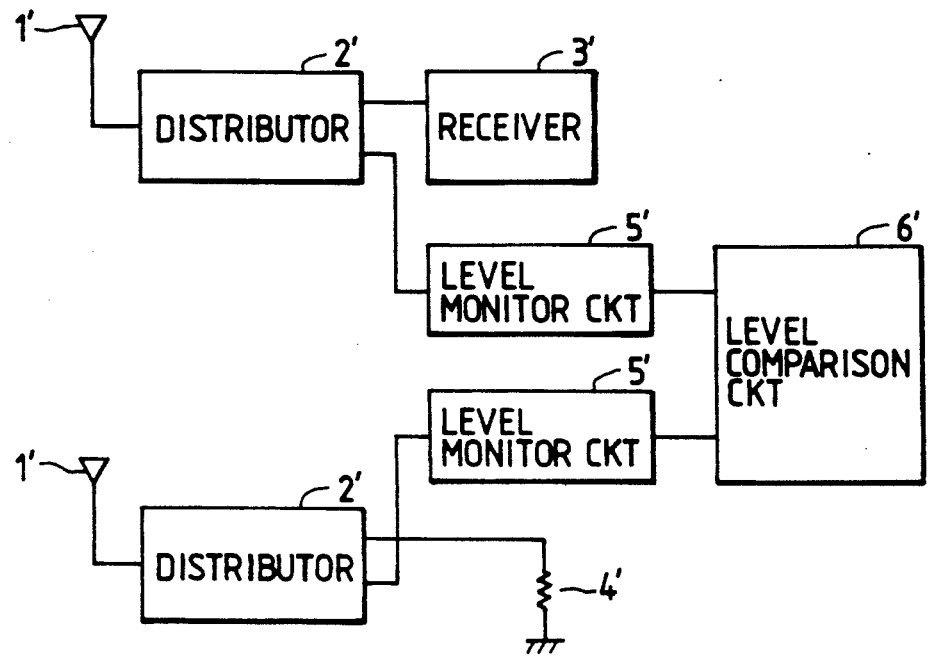
FIG. 1 is a block diagram showing the arrangement of a conventional diversity signal receiving apparatus.
Figure 2A:
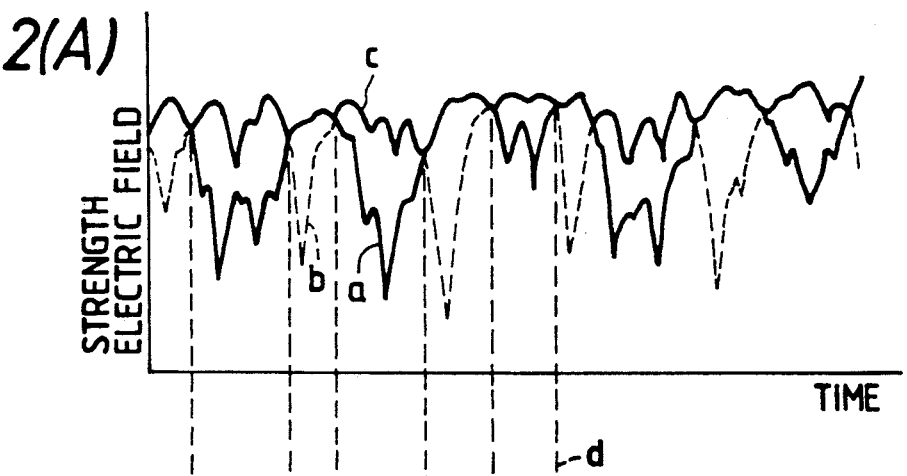
FIGS. 2A, 2B, 2C and 3A, 3B, 3C are diagrams illustrating the signal reception levels of the conventional diversity signal receiving apparatus as shown in FIG. 1 and the antenna switching timing thereof.
Figure 2B:
Figure 2C:
Figure 3A:
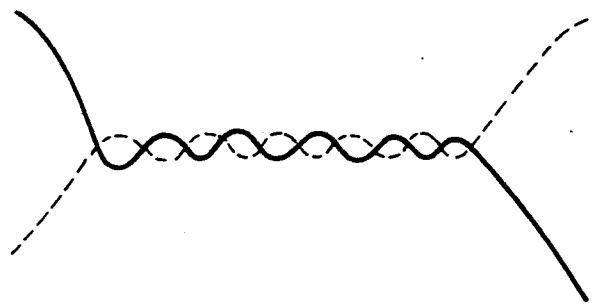
Figure 3B:
Figure 3C:
Figure 5A:
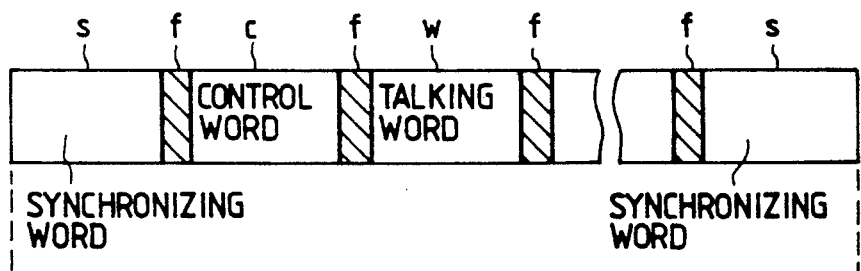
FIGS. 5A, 5B and 5C are a diagram demonstrating the operation of the diversity receiving antenna communication system.
Figure 4:
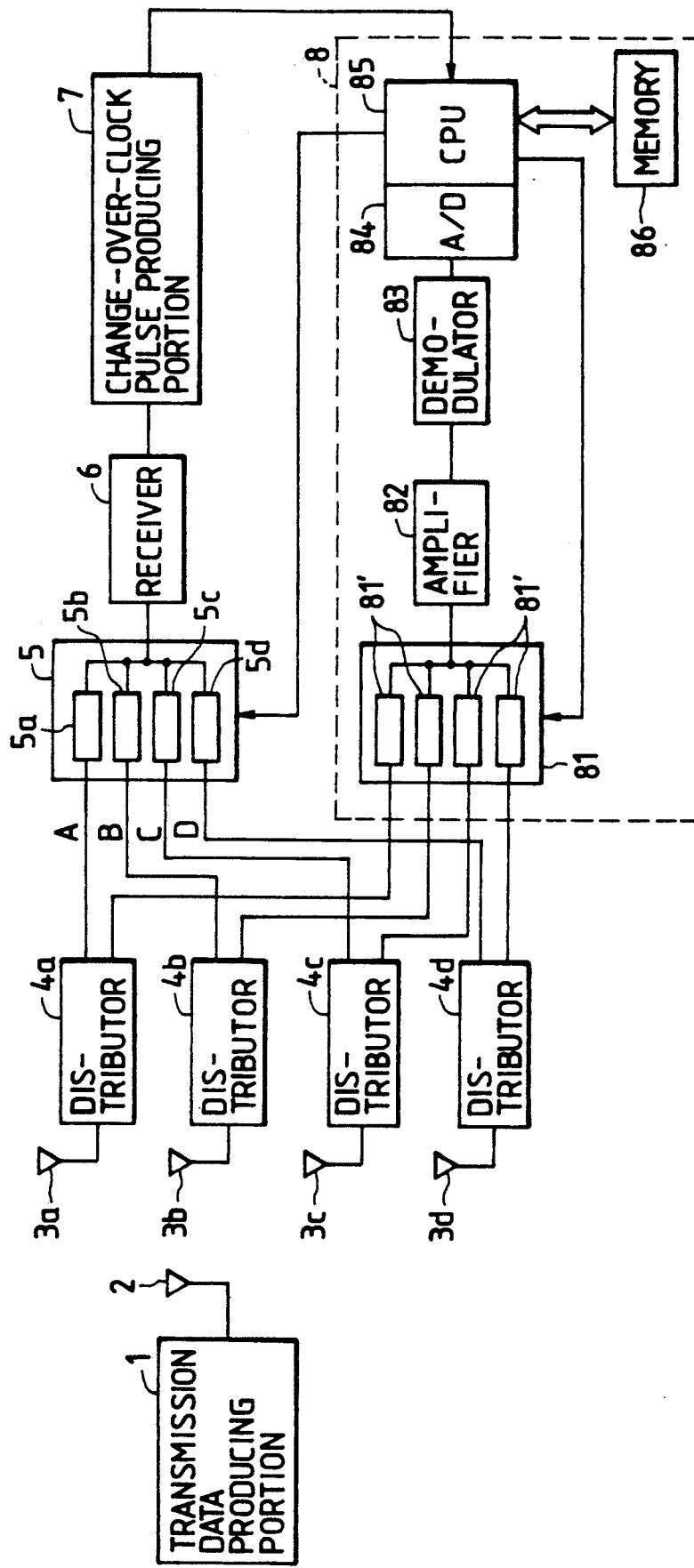
FIG. 4 is a block diagram illustrating the diversity receiving antenna communication system, which is an embodiment of the present invention.

FIG. 4 shows a block diagram of a diversity receiving antenna communication system according to a first embodiment of the present invention, having a transmission side and a reception side. A transmission side comprises: a transmitting data producing means 1 for producing a series of data with receiving system changeover flags (f) inserted at the regions other than data region for data blocks, such as a synchronizing word (s), a control word (c) (a call signal, or the like), a talking word (w), and so on; and a transmitting antenna 2 for radiating the produced series of data (as shown in FIG. 5(A)). In this embodiment, the receiving system change-over flags (f) are inserted at intervals between the data blocks. However, the receiving system change-over flags(f) may be disposed at any regions so far as the regions are not overlapped with the data region.

Figure 5B:
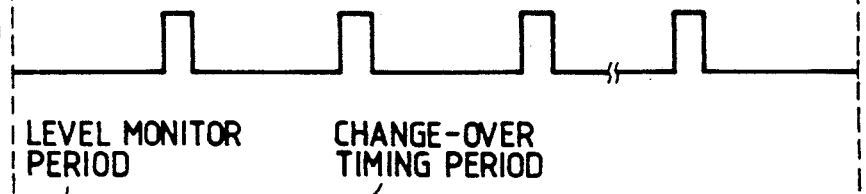
Figure 5C:

A reception side, located on the mobile body, comprises: directive antennas 3a, 3b, 3c and 3d, (each generally situated at an angular interval of 90° C. and covering all directions from 0 to 360 degrees); distributors 4a, 4b, 4c and 4d for distributing each of the reception signals from the respective directive antennas 3a, 3b, 3c and 3d to a receiving system change over means 5 and a level comparator as described below; the receiving system change-over means 5 for selecting a channel, in which the maximum reception level can be obtained from channels 5a, 5b, 5c and 5d in accordance with a receiving system change-over signal (described later); a receiver 6 for extracting the synchronizing word (s), the control word (c), the talking word (w), and the receiving system change-over flags (f) from the reception signal supplied through the channel providing the maximum reception level by the receiving system change-over means 5; a change-over clock pulse producing means 7 for producing a change-over clock pulse (as shown in FIG. 5(B)) having a period corresponding to the receiving system change-over flag (f) extracted by the receiver 6; and a level comparator 8 for receiving the change-over clock pulse from the change-over clock pulse producing means 7, monitoring and comparing the reception levels of the respective reception signals from distributors 4a, 4b, 4c and 4d, to select one of the receiving systems in which the maximum reception level can be obtained, and supplying a receiving system change-over signal (as shown in FIG. 5(C)) to the receiving system change-over means 5 at the input timing of the change-over clock pulse. Since a propagation path is constituted by the transmitting antenna 2 to the channels of the receiving system change-over means 5, it is defined that the receiving systems are constituted by the components along this path (i.e., a transmitting antenna, a directive antenna, a respective distributor, and a respective channel). The number of the receiving systems may be increased or decreased.

The level comparator 8 will be described in more detail. The level comparator 8 comprises a multiplexer 81, an amplifier 82, a demodulator 83, an A/D converter 84, a CPU 85, and a memory 86. The multiplexer 81 changes over channels 81' from one to another every predetermined period (unlike the receiving system change-over means 5, which only changes over to a new channel in response to a receiving system change-over signal from the CPU 8) in accordance with a timing signal supplied from the CPU 85 to supply one of the reception signals from the distributors 4a, 4b, 4c and 4d to the amplifier 82. Accordingly, the CPU 85 can sample the reception signals from each directive antenna 3a, 3b, 3c and 3d, to determine which receiving system has the maximum reception level. The demodulator 83 envelope-detects the amplified reception signal. The A/D converter 84 converts the envelope-detected signal to a digital signal. The CPU 85 stores the digital signal (corresponding to the reception level) in the memory 86, and then compares the signals to select the receiving system in which the maximum reception level can be obtained. Upon selection of a new receiving system, the CPU 85 supplies a receiving system change-over signal to the receiving system change-over means 5 when the change-over clock pulse producing means 7 produces the change-over clock pulse. In other words, the CPU 85 has a reception level monitoring period (as shown by a stripe in FIG. 5(C)) for supplying a channel change-over signal to the multiplexer 81 and a change-over timing period (as shown by a slant line in FIG. 5(C)) for outputting a receiving system change-over signal with a period which is an integer multiple of the reception level monitoring period.

The operation of the diversity receiving antenna communication system having the above-mentioned configuration will be described with reference to FIG. 5, in which FIG. 5(A). shows transmission data produced by the transmission data producing portion 1, FIG. 5(B) shows a period of a change-over clock pulse, and FIG. 5(C) shows the relationship between the reception level monitoring period and the change-over timing period.

A data signal radiated from the transmission data producing means 1 includes a synchronizing word (s), a control word (c), a talking word (w) and so on, which are formatted therein. Receiving system change-over flags (f) are inserted, for example, between the words as shown in FIG. 5(A). A series of data signals thus constructed are transmitted through the transmitting antenna 2 to all the mobile bodies located within a radio wave radiation area. Control data are designated as either general calling data, or specified mobile body/-bodies calling data to call the appropriate mobile station or stations.

At the mobile station side, directive antennas 3a, 3b, 3c and 3d are disposed in two directions to receive the radio waves. The distributors 4a, 4b, 4c and 4d distribute each reception signal to the receiving system change-over means 5 and the level comparator 8. One of the reception signals distributed to the receiving system change-over means 5 is applied to the receiver 6 through one of the channels 5a, 5b, 5c and 5d which is selected in response to the change-over means control signal from the level comparator 8 to maximize the reception level. The control word (c), the talking word (w), and the receiving system change-over flags (f) are extracted from the reception signal by the receiver 6. A change-over clock pulse is produced by the change-over clock pulse producing means 7 on the basis of the receiving system change-over flags (f).

Meanwhile, the reception signals distributed to the level comparator 8 by the distributors 4a, 4b, 4c and 4d are fed successively to the amplifier 82 through the channels 81' of the multiplexer 81 at the predetermined period. The envelope of the reception signals is detected by the demodulator 83 and converted by the A/D converter 84 to digital data. The digital envelope data (i.e., the reception levels) are stored in the memory 86, and compared in the CPU 85 to select one of the receiving systems in which the maximum reception level can be obtained.

Upon reception of the change-over clock pulse from the change-over clock pulse producing means 7, the CPU 85 supplies the receiving system change-over means 5 with the change-over means control signal for instructing a change-over from one receiving system to another receiving system providing the reception signal of the maximum reception level.

Figure 6A:
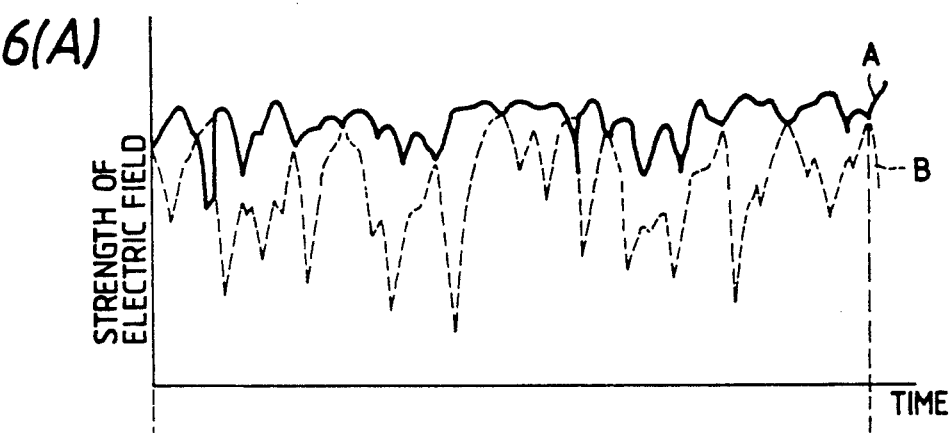
FIGS. 6A, 6B and 6C are a diagram illustrating the output timing of the receiving system change-over flag and the receiving system change-over signal over a predetermined period.
Figure 6B:
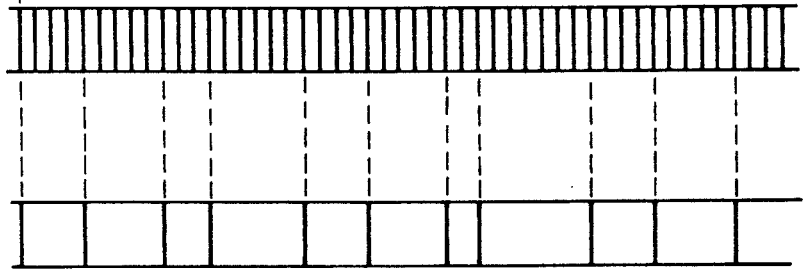
Figure 6C:
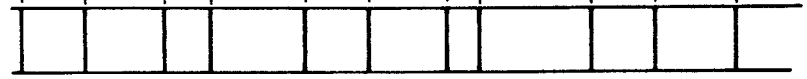

As shown in FIG. 6, the two receiving systems can be compared with respect to their electric field intensity. On inversion of reception levels A and B, the system will change-over from one receiving system to another on the very next change-over clock pulse. As a result, signal reception can be made at the maximum reception level without loss of data because the change-over action occurs in the regions other than data blocks. In addition, if the receiving system change-over flags (f) are inserted at intervals between the data blocks, the signal reception can be made every data block.

Fading may be reduced by suitably setting the duration and period of the receiving system change-over flag based upon a relationship with a fading period which, in turn, depends on the length of the block data and the speed of the mobile body.

Although the transmission efficiency is lowered in the above-mentioned embodiment because at least one 1-bit receiving system change-over flag is inserted at every interval between data, the transmission efficiency is superior to the case where retransmission of data is required. In comparison with a system in which a correction code is added to each block data, it is possible to shorten the length of data to further improve the transmission efficiency.

As described above, in the diversity antenna communication system according to the present invention, a radio wave having receiving system change-over timing signals inserted at the regions other than those for data, for example, at intervals between the data is radiated from the transmission side. At the reception side, the receiving system change-over timing signals are extracted out of the radio wave and used to produce a change-over clock pulse. Meanwhile, a level comparator 8 is continuously monitoring the reception levels of receiving systems to discern the maximum reception level. Upon inversion of reception levels, the level comparator 8 sends receiving system change-over means 5 an instruction signal for switching one receiving system to the other to obtain the maximum reception level. This instruction is sent at a period corresponding to the receiving system change-over timing signals. Therefore, the receiving system can be changed over at periods other than those for the data. Accordingly, it is possible to prevent data from being lost at the time of change-over of the receiving system.

Figure 7:
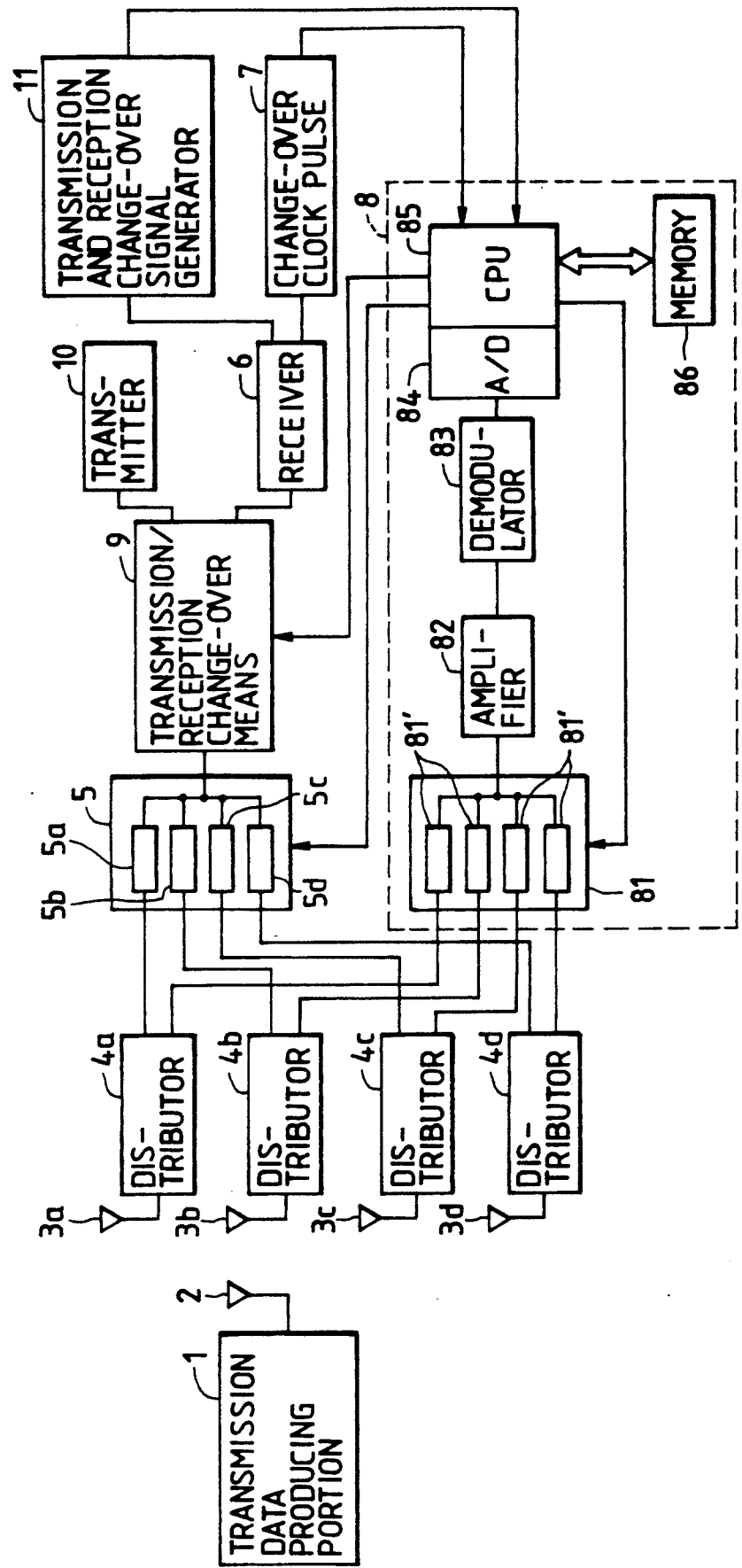
FIG. 7 is a block diagram showing the arrangement of a diversity receiving antenna communication system, which is another of the invention.

FIG. 7 shows the arrangement of the diversity receiving antenna communication system of another embodiment of the invention. The system shown in FIG. 7 is different from that shown in FIG. 4 in that the diversity antennas are utilized for signal transmission and reception.

In the embodiment, the signal receiving system change-over means 5 is connected to a transmission and reception change-over means 9, which is connected to the receiver 6 and to a transmitter 10, and the receiver 6 is connected to a transmission and reception change-over signal generator 11 which produces a data reception acknowledge signal and a transmission and reception change-over signal for switching signal reception over to signal transmission in response to a data transmission request signal provided by the operator. The transmission and reception change-over signal produced by the transmission and reception change-over signal generator 11 is applied to the CPU 85 in the level comparison circuit 8.

The CPU 85, in response to the transmission and reception change-over signal, reads the envelope data from the memory 86, and applies a signal to the signal receiving system change-over means 5 to select the signal receiving system providing the highest reception level, and supplies an instruction signal for switching signal reception over to signal transmission to the transmission and reception change-over means 9.

Figure 8:
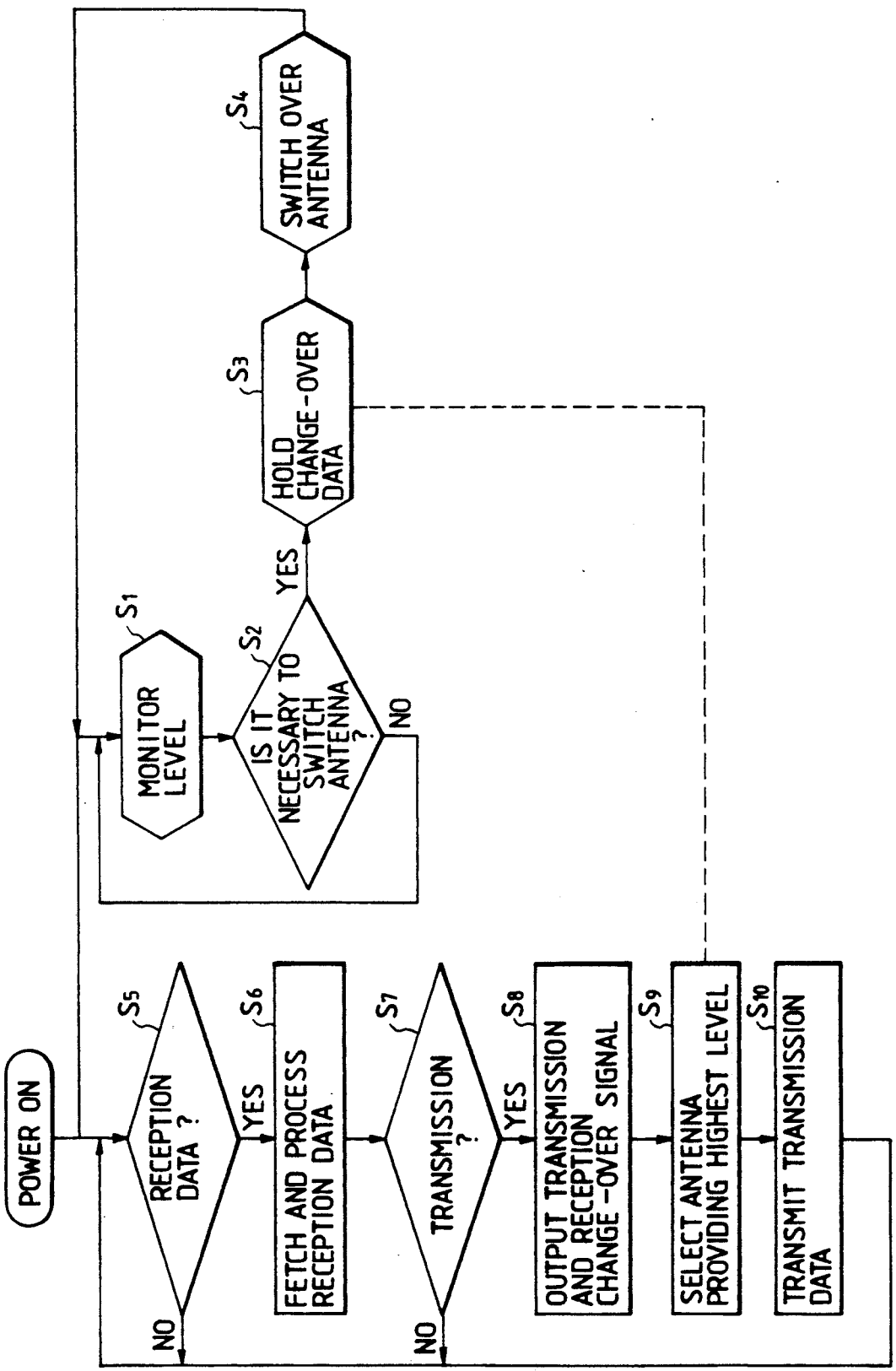
FIG. 8 is a flow chart for explaining the operation of the diversity antenna communication system shown in FIG. 7.

The diversity antenna communication system thus organized will be described with reference to a flow chart shown in FIG. 8.

In Step $S_1$, the reception levels of the signal receiving systems are detected, so that the antenna providing the highest reception level is determined.

In Step $S_2$, it is determined whether or not the antenna providing the highest reception level is being used for actual signal reception. When it is determined that the antenna being used for actual signal reception provides the highest reception level, then Step $S_1$ is effected again; and when it is not, in Step $S_3$ the change-over data (reception level) is stored in the memory 86 until arrival of the change-over clock pulse.

In Step $S_4$, upon arrival of the change-over cock pulse, the antenna in signal reception is switched over to the antenna providing the highest reception level, and the level monitoring operation in Step $S_1$ is carried out again. (The operations in Steps $S_1$ through $S_4$ are performed by the level comparison circuit 8.)

In Step $S_5$, the receiver determines according to a block data received whether or not it is a reception data. When it is determined that it is a reception data, then in Step $S_6$, the data is fetched and processed, for instance, into audio signals. When it is determined that it is not a reception data, Step $S_5$ is effected again (standby for signal reception).

In Step $S_7$, it is determined whether or not the transmission and reception change-over signal generator 11 has received the data reception acknowledge signal (ACK) from the receiver 6, and it is determined whether or not the operator has provided the data transmission request signal. When no such signals have been provided, the operation in Step 5 is carried out again.

When it is determined that those signals have been provided, in Step $S_8$ the transmission and reception change-over signal is produced and applied to the level comparison circuit 8, and in Step $S_9$ with the change-over data read out of the memory 86, the antenna providing the highest reception level is selected and the reception-to-transmission and reception change-over instruction signal is applied to the transmission and reception change-over means 9.

In Step $S_{10}$, transmission data is transmitted through the antenna providing the highest reception level. Upon completion of the transmission, Step $S_5$ is effected again.

In the above-described embodiment, the level comparison circuit 8 detects the antenna providing the highest reception level on the basis of the reception levels which are monitored at all times. In transmission of data, the transmission and reception change-over means 9 operates to connect the transmitter to the antenna thus detected; that is, the transmission is carried out with the antenna which provides the highest reception level. In this case, the called station can receive the signal at a maximum level because of the antenna reversibility that the antenna providing the highest signal reception level at a transmission side can provide the highest signal reception level at a reception side. Thus, the mobile body communication can be improved in quality, and the difficulty that transmission data is not transmitted to the called station can be substantially eliminated.

Figure 9:
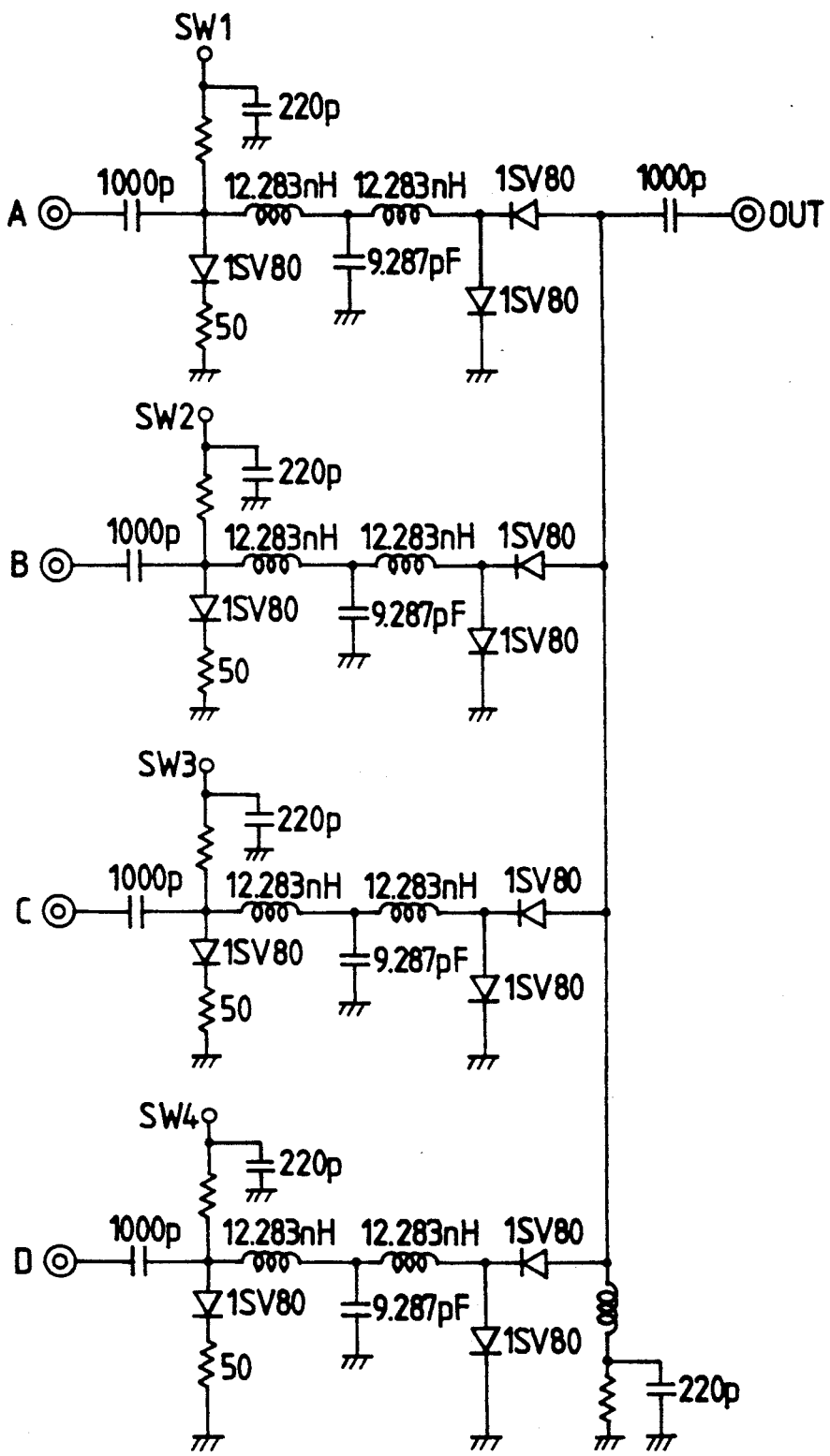
FIG. 9 is one example of the circuit arrangement of the receiving system change-over means in the diversity antenna communication system of this invention.

In the communication system of the invention, unlike the conventional communication system using monopole antennas, the directional antennas are used with transmission and reception modes alternated, which eliminates the difficulty that a mobile body (mobile station) receives the radio wave which it has transmitted. In the embodiments as described above, the receiving system change-over means has a circuit arrangement, for example, as shown in FIG. 9, but is not limited thereto.

The invention is not limited to the above-described embodiment only. For instance, it may be modified as follows: Of the antennas of four signal receiving system, the antenna providing the highest reception level is interrupted, and the remaining three antennas are used for signal transmission and reception. In this case, signal reception is made with fading reduced, and signal transmission can be made over a wide range. Therefore, for instance in the case of an emergency, the mobile station can communicate with stations other than predetermined stations.

Figure 10:
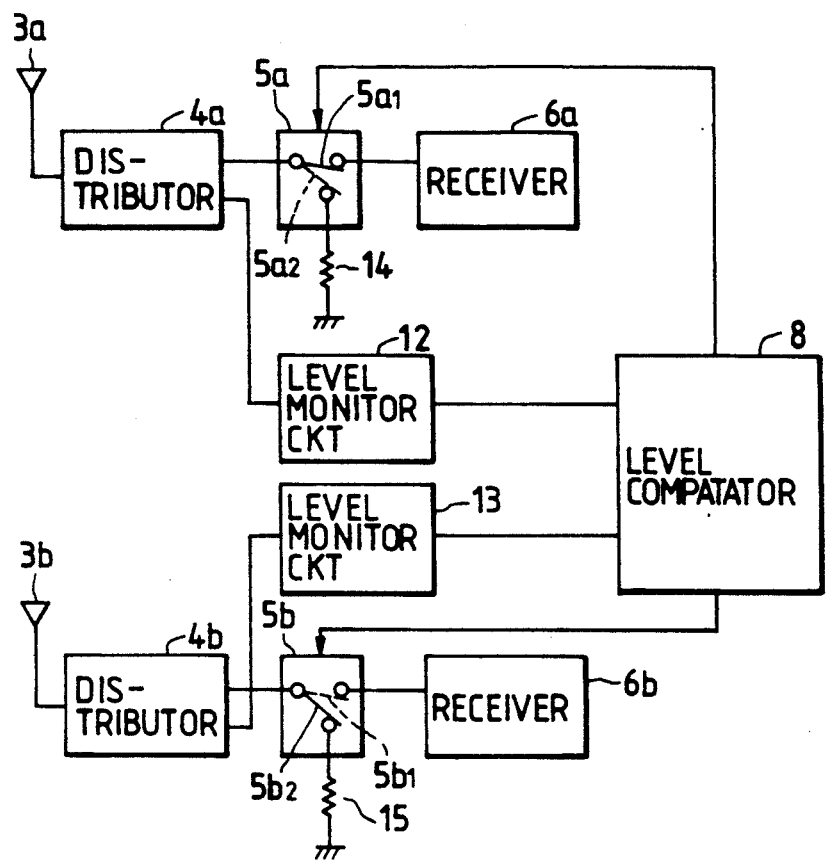
FIG. 10 is a block diagram showing one example of a diversity signal receiving apparatus, which is another embodiment of the invention.

FIG. 10 shows one example of a diversity signal receiving apparatus, which is another embodiment of the invention. The diversity signal receiving apparatus has two signal receiving systems A and B different in propagation path; and a level comparison circuit 8 for detecting the signal receiving system which provides a higher reception level than the other, to output a signal receiving system change-over signal. In the signal receiving system A, a signal receiving antenna 3a is connected to a distributor 4a, which is connected to a level monitor circuit 12 and signal receiving system change-over means 5a, and the latter 5a is connected to a receiver 6a and a dummy resistor 14 whose impedance is lower than the equivalent resistance of the receiver 6a. In the signal receiving system B, similarly as in the above-described signal receiving system A, a signal receiving antenna 3b is connected to a distributor 4b, which is connected to a level monitor circuit 13 and a signal receiving system change-over means 5b, and the latter 5b is connected to a receiver 6b and a dummy resistor 15 whose impedance is lower than the equivalent resistance of the receiver 6b. In this embodiment, unlike the embodiment as shown in 4, the level monitor circuits 12 and 13 are provided independently of the level comparison circuit 8; however, they may be made integral with the level comparison circuit similarly as in the level comparison circuit shown in FIG. 4.

Since the two signal receiving systems A and B are equal to each other in arrangement, only the signal receiving system A will be described. The signal receiving antenna 3a is a directional antenna, which receives a radio wave having its arrival angle in a predetermined range, and supplies it to the distributor 4a. For the directional antenna, there are available a variety of antennas such as a horn reflector type antenna and a corner reflector type antenna.

The distributor 4a operates to distribute the signal received through the antenna 3a to the level monitor circuit 12 and the signal receiving system change-over means 5a in a predetermined proportion. It is made up of a combination of transformers, or a combination of capacitors. However, the signal may be distributed in other simple methods.

The signal receiving system change-over means 5a comprises two paths 5a1 and 5a2 one of which is selected in response to the change-over signal provided by the level comparison circuit 8. Through the path 5a1 the received signal from the distributor 4a is applied to the receiver; whereas through the path 5a2 it is applied to the dummy resistor 14. The signal receiving system change-over means may be either a semiconductor switch element or relay; however, for high speed switching operation, it is preferable to use the semiconductor switch element.

The receiver 6a is to demodulate the received signal provided by the distributor 4a to obtain predetermined data (such as talking data, control data, etc.), and it is impedance-matched with the receiving antenna 3 before use.

The impedance of the dummy resistor 14 is lower than the equivalent resistance of the receiver 6a. The dummy resistor functions to attenuate the input signal by several decibels (dB) in comparison with that to the receiver 6a. However, an excessive attenuation of the input signal will adversely affect the detection of fading. Therefore, the impedance of the dummy resistor is suitably determined with the relationship between the received signal level and the fading.

The level monitor circuit 12 operates to detect the envelope of the received signal applied thereto through the distributor 4a, thereby to detect its reception level.

The level comparison circuit 8 compares both of the reception levels of the two signal receiving systems provided through the level monitor circuits 12 and 13, to predetermined data are obtained through demodulation. On the other hand, the reception signal applied to the change-over means 5b in the signal receiving system B is supplied through the path 5b2 to the dummy resistor 15.

On the other hand, the reception signals supplied to the level monitors circuits 12 and 13 are processed for detection of their reception levels; that is, the reception levels of the two signal receiving systems are monitored by the level monitor circuits 12 and 13, respectively. In this case, because of the impedance mismatching of the dummy 15, the reception level of the signal receiving system B is lower by several decibels (dB) than the true reception level as indicated by the one-dot chain line in FIG. 11(A).

The level comparison circuit 8 compares the reception levels of the two receiving systems provided by the level monitor circuits 12 and 13, thereby to select one of the signal receiving systems which is higher in reception level.

When the reception levels are not alternated, the signal reception is continued with the present signal receiving system A. When the reception levels are alternated, an instruction signal is applied to the signal receiving system change-over means 5a in the signal receiving system A to switch the receiver 6a over to the determine the signal receiving system which is higher in reception level, and applies an instruction signal to the signal receiving system change-over means in the other (preceding) signal receiving system to switch the receiver over to the dummy resistor, and applies an instruction signal to the signal receiving system change-over means in the signal receiving system higher in reception level to switch the dummy resistor over to the receiver.

The operation of the diversity signal receiving apparatus will be described with reference to FIG. 11.

Figure 11A:
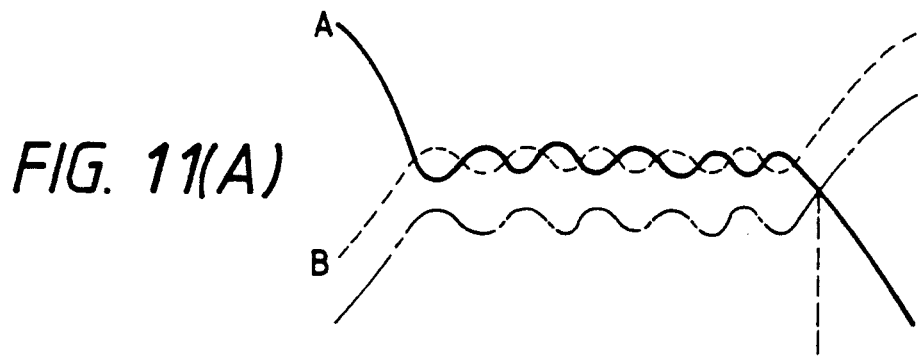
FIGS. 11A, 11B and 11C are a diagram for explaining the operation of the diversity signal receiving apparatus shown in FIG. 9.

It is assumed that, with the antenna 3a connected to the receiver 6a and with the antenna 3b connected to the dummy resistor 15, the reception input (indicated by the solid line in FIG. 11(A)) of the signal receiving system A is substantially equal to that (indicated by the broken line in FIG. 11(A)) of the signal receiving system B.

Radio waves arriving along different propagation paths are received by the receiving antennas 3a and 3b, and are applied through the distributors 4a and 4b to the signal receiving system change-over means 5a and 5b and the level monitor circuits 12 and 13, respectively.

Figure 11B:
Figure 11C:

The reception signal applied to the change-over means 5a in the signal receiving system A is supplied through the path 5a1 to the receiver 6a, so that dummy resistor 14 (as shown in FIG. 11(B)) while an instruction signal is applied to the signal receiving system change-over means 5b in the signal receiving system B to switch the dummy resistor 15 over to the receiver 6b (as shown in FIG. 11(C).

If, in this case, the reception levels are substantially equal to each other, since the reception level of the signal receiving system B in which the dummy resistor 15 is selected is set lower by several decibels (dB) than that of the signal receiving system A in which the receiver 6a is selected, the level comparison circuit 8 allows the signal reception by the signal receiving system unless the reception level of the signal receiving system exceeds that of the signal receiving system A by several decibels (dB). When the level of the input signal in the signal receiving system B increases so that the reception levels are alternated, the change-over signals are outputted. Therefore, in the case where the reception levels are substantially equal to each other, the frequency of switching the signal receiving systems can be decreased, and therefore the data loss can be prevented.

Figure 12:
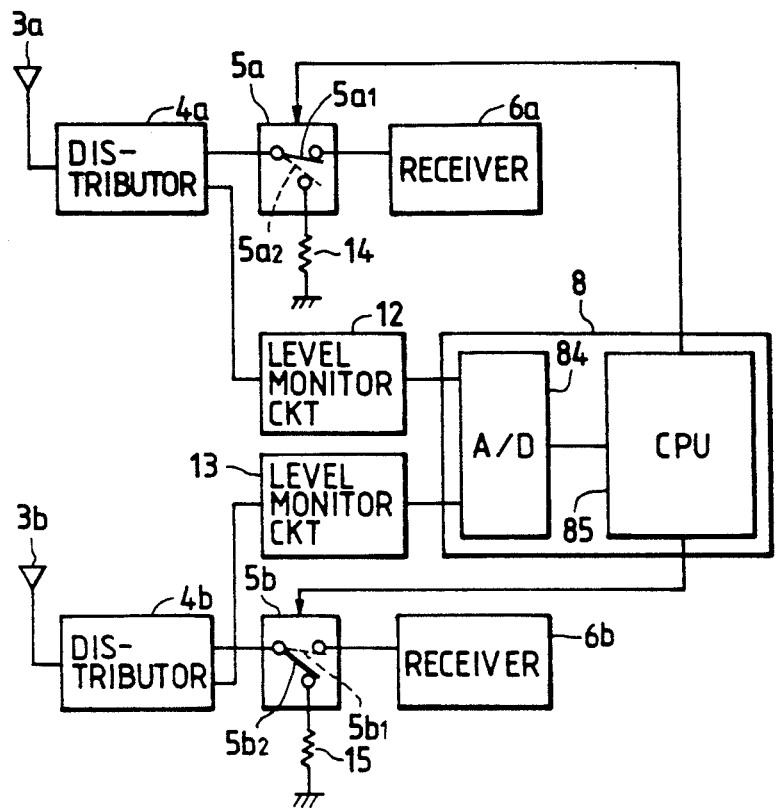
FIG. 12 is a block diagram showing the arrangement of another example of the diversity signal receiving apparatus according to the invention.

FIG. 12 is a block diagram showing the arrangement of another example of the diversity signal receiving apparatus shown in FIG. 10. The apparatus shown in FIG. 12 is different from that shown in FIG. 10 in that the impedances of the dummy resistors 14 and 15 are equal to those of the receivers 6a and 6b, respectively, and, similarly as in the case of FIG. 4, the level comparison circuit 8 is made up of an A/D (analog-to-digital) converter 84 and a CPU 85.

The A/D converter 84 converts to digital signals the output signals of the level monitor circuits 12 and 13 which are obtained by envelope detection.

Figure 13A:
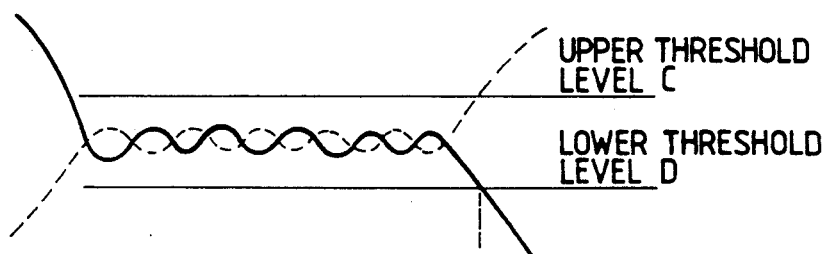
FIGS. 13A, 13B and 13C are a diagram for explaining the operation of the diversity signal receiving apparatus shown in FIG. 11.

The CPU 85 compares the output data of the A/D converter 84, to detect the alternation of the reception levels, and sets the upper threshold value and the lower threshold value with respect to the reception levels at the alternation thereof as shown in FIG. 13(A), so that, when the reception level of the present signal receiving system becomes lower than the lower threshold value while the reception level of the other signal receiving system higher in reception level exceeds the upper threshold value, it issues an instruction signal to switch the present signal receiving system over to the other signal receiving system higher in reception level. The width between the upper and lower threshold values (hysteresis) is determined in advance; that is, it has several decibels (dB) across the reception level provided at the alternation.

The operation of the diversity signal receiving apparatus will be described with reference to FIG. 13.

Similarly as in the case of FIG. 11, it is assumed that the input signals of the signal receiving systems are substantially equal to each other in level as shown in FIG. 9(A). In FIG. 13, characters C and D designate the above-described upper and lower threshold values, respectively.

Figure 13B:
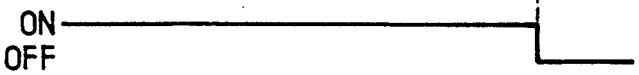
Figure 13C:

The output envelope signal of the level monitor circuits 12 and 13 are applied to the A/D converter 84, where they are converted into digital signals. The digital signals are supplied to the CPU 85. The CPU 85 compares the digital signals to detect the alternation of the reception levels. Thereafter, the CPU sets the upper and lower threshold values on both sides of the reception level provided at the alternation time. When, under this condition, the reception level of the present signal receiving system A becomes lower than the lower threshold value while the reception level of the signal receiving system B higher in reception level exceeds the upper threshold value, the CPU 85 applies an instruction signal to the signal receiving system change-over means 5a in the signal receiving system A to switch the receiver 6a over to the dummy resistor 14 as shown in FIG. 13(B), and applies an instruction signal to the signal receiving system change-over means 5b in the signal receiving system higher in reception level to switch the dummy resistor 15 over to the receiver 6b as shown in FIG. 13(C).

That is, until the reception level of the present signal receiving system becomes slower than the lower threshold value and the reception level of the other signal receiving system exceeds the upper threshold value, the CPU does not switch the present signal receiving system over to the other; i.e., the present signal reception is continued. Therefore, when the reception levels are substantially the same, the frequent switching of the signal receiving systems over to each other is suppressed, and the data loss is prevented accordingly. In addition, in the diversity signal receiving apparatus, the dummy resistors 14 and 15 are matched in impedance with the receiving antennas 3a and 3b, respectively, and therefore no unwanted reflected waves are produced.

Figure 14:
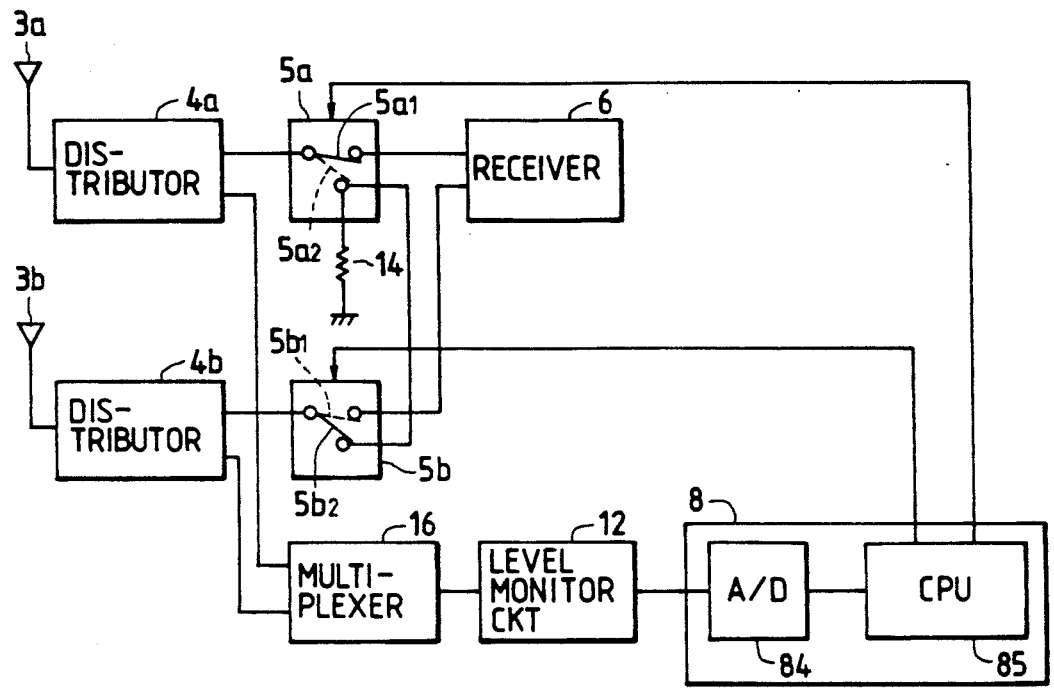
FIG. 14 is a block diagram showing the arrangement of another example of the diversity signal receiving apparatus according to the invention.

FIG. 14 is a block diagram shown in the arrangement of a diversity signal receiving apparatus which is a further embodiment of the invention. The apparatus shown in FIG. 14 is different from that shown in FIG. 12 in that the distributors 4a and 4b are connected to a multiplexer 16, which is connected to one level monitor 12, and the two signal receiving systems 5a and 5b are connected, commonly to one receiver 6 and one dummy resistor 14. More specifically, the path 5a1 of the signal receiving system change-over means 5a is connected to the receiver 6 and the path 5a2 is connected to the dummy resistor 14; and the path 5b1 of the other signal receiving system changeover means 5b is connected to the receiver 6 and the path 5b2 is connected to the dummy resistor 14.

The diversity signal receiving apparatus thus organized operates as follows:

The multiplexer 16 operates to switch the input signals applied thereto through the distributors 4a and 4b over to each other every predetermined period of time and supply them to the level monitor circuit 12, and the signal receiving system change-over means 5a and 5b. The level monitor circuit 12 subjects to envelope detection the input signals supplied thereto alternately every predetermined period of time, and applies it to the level comparison circuit 8. Similarly as in the case of FIG. 12, the level comparison circuit 8 detect the alternation of the reception levels, so that an instruction signal is applied to the signal receiving system change-over means in the present signal receiving system to switch the receiver 6 over to the dummy resistor 14, and an instruction signal is applied to the signal receiving system change-over means in the other signal receiving system higher in reception level to switch the dummy resistor over to the receiver.

Thus, the provision of the multiplexer 16 permits reduction of the numbers of level monitor circuits, receivers and dummy resistors; that is, the apparatus employs one level monitor circuit, one receiver, and one dummy resistor for the same effect, with the result that the manufacturing cost is reduced as much.

Figure 15:
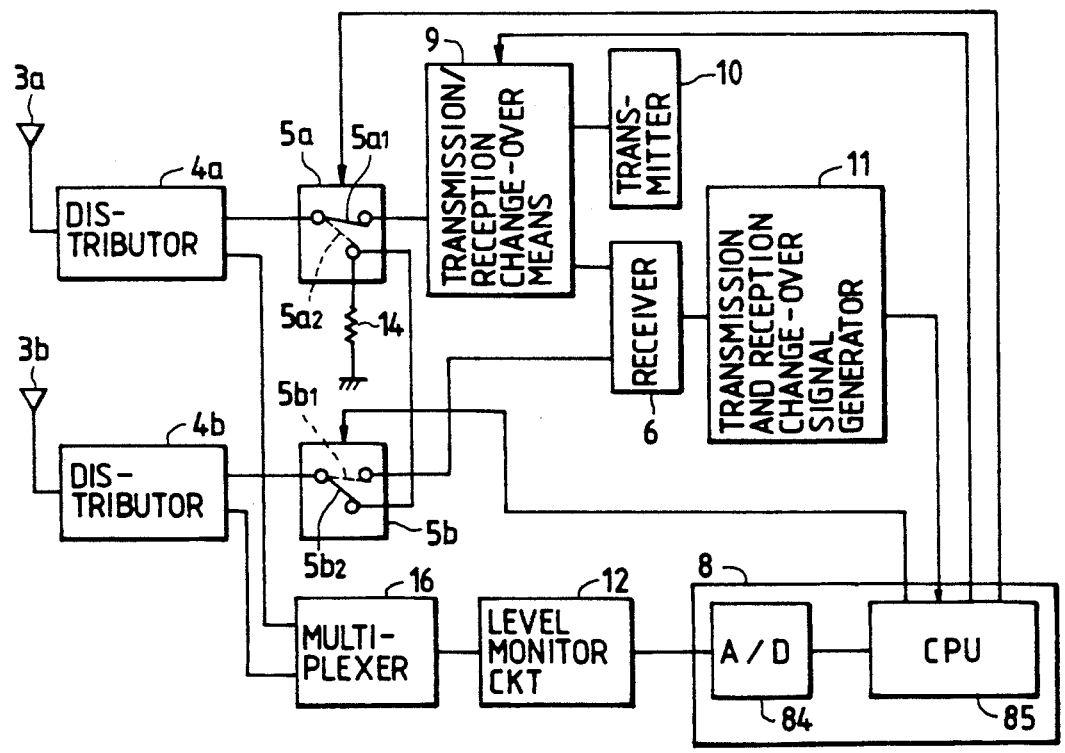
FIG. 15 is a block diagram illustrating the diversity signal receiving apparatus of FIG. 13 which is equipped with a transmitter according to the invention.

FIG. 15 is a block diagram showing the diversity signal receiving apparatus of FIG. 14 which is provided with a transmission function according to the invention. In the apparatus, the signal receiving system change-over means 5a and 5b are connected to a transmission and reception change-over means 9, which is connected to the receiver 6 and a transmitter 10, and the receiver 6 is connected to a transmission and reception change-over signal producing section 11 which produces a transmission and reception change-over signal to switch reception over to transmission in response to a data reception acknowledge signal or a data transmission request signal provided by the operator. The transmission and reception change-over signal thus produced is applied to the CPU 85 in the level comparison circuit 8.

In response to the transmission and reception change-over signal, the CPU 85 applies an instruction signal to the signal receiving system change-over means 5 to select the signal receiving systems which is highest in reception level, and supplies a reception-to-transmission change-over instruction signal to the change-over means 9.

In the above-described diversity antenna communication system, the level comparison circuit 8 suppresses the frequency of switching the antennas over to each other when the reception levels are substantially equal to each other, with the result that, even in transmission of data with the transmitter, the frequency of switching the antennas over to each other is decreased, and the loss of transmission data can be prevented.

In the system according to the first aspect of the invention, the signal transmission side transmits a radio wave including the signal receiving system change-over signal inserted in the region other than data region, for example, between data region, and the signal reception side extracts the signal receiving system change-over signal from the radio wave received, and selects the signal receiving system highest in reception level at the period corresponding to the signal receiving system change-over signal thus extracted, and therefore the possibility of data loss at the alternation in reception level of the signal receiving systems can be eliminated.

In the apparatus according to the second aspect of the invention, the monitor level setting means sets the reception level of the signal receiving system which is not used for actual signal reception to a lower level than the monitor level of the signal receiving system which is used for actual signal reception, and therefore when input signals are substantially equal in reception level, the signal receiving system detecting means detects the present signal receiving system as highest in reception level. Thus, in the case when signals substantially equal in reception level are received, the signal receiving system change-over means does not perform the switching of the signal receiving system, which reduces the possibility of data loss.

In the apparatus according to the third aspect of the invention, when the reception level of the present signal receiving system becomes lower than the lower threshold value while the reception level of the signal receiving system highest in reception level exceeds the upper threshold value, the present signal receiving system is switched over to the signal receiving system highest in reception level. Therefore, when in put signals are substantially equal in reception level, the switching of the signal receiving systems is not carried out. In other words, when input signals are substantially equal in reception level, the signal receiving system change-over means does not operate, with the result that the possibility of data loss is reduced.

In the system according to the forth aspect of the invention, the antenna in the signal receiving system highest in reception level is used as a transmitting antenna, so that the called station (or fixed station) can receive a radio wave with less fading, which reduces the probability that transmission data is not transmitted to the station.

In the system according to the fifth aspect of the invention a signal receiving system of the lowest level in signal reception level of at least two signal receiving systems is interrupted, and the antennas in the remaining signal receiving systems are used for signal communication. Thus, signals can be received with less fading, and can be transmitted over a wide range, with the result that, for instance in an emergency, signal communication can be made with stations other than the predetermined stations.

What is claimed is:

1. A diversity antenna communication system comprising:
    a transmission side for producing and radiating a series of signals including data signals and receiving system change-over timing signals; and
    a reception side comprising:
    plural receiving systems for receiving the series of signals;
    change-over clock pulse producing means for producing a change-over clock pulse in response to each of the receiving system change-over timing signals;
    level comparing means for monitoring and comparing respective reception levels of the received data signals at a predetermined period and outputting a change-over control signal indicating the comparative result in response to the change-over clock pulse; and
    receiving system change-over means for selecting from said plural receiving systems a receiving system providing the data signals of the maximum reception level in response to the change-over control signal and outputting the series of the data signals and the receiving system change-over timing signals of said receiving system.

2. A diversity antenna communication system as claimed in claim 1, wherein said receiving system change-over timing signals are provided in the time regions other than those for said data signals.

3. A diversity antenna communication system as claimed in claim 2, wherein said receiving system change-over timing signals are inserted at intervals between said data signals.

4. A diversity receiving antenna communication system as claimed in claim 3, wherein said change-over clock pulse producing means produces a change-over clock pulse having a period corresponding to the receiving system change-over signals.

5. A diversity antenna communication system as claimed in claim 1, wherein each of said receiving systems comprises a directive antenna for receiving the radiated series of signals including the data signals and the receiving system change-over timing signals, and a distributor for distributing the received series of signals from each of said directive antennas into said receiving system change-over means and said level comparing means.

6. A diversity antenna communication system as claimed in claim 1, wherein said level comparing means comprises:
- a multiplexer having a plurality of channels for changing over channels from one to another at the predetermined period;
- an amplifier for amplifying the received series of signals;
- a demodulator for detecting an envelope of the amplified received series of signals;
- a converter for converting the enveloped detected series of signal to a digital signal;
- a CPU for controlling the operation; and
- a memory for storing the digital signal.

7. A diversity antenna communication system as claimed in claim 1, wherein said reception side further comprises a receiver for receiving the series of the data signals and the receiving system change-over timing signals outputted from said receiving system change-over means, a transmitter for transmitting a series of signals, transmission and reception change-over signal generating means for producing and outputting to said level comparing means and an instruction signal for transmission in response to a data transmission request signal provided by an operator, and transmission and reception change-over means for switching the connection of said receiver and said receiving system providing the maximum reception level to that of said transmitter and said receiving system in response to said instruction signal.

8. A diversity antenna communication system comprising:
- a transmission side comprising:
  - a transmitting data producing means for producing a series of data having receiving system change-over flags inserted at intervals between data blocks;
  - a transmitting antenna for radiating the series of data; and
- a reception side comprising:
  - a plurality of directive antennas for receiving the radiated series of data;
  - a plurality of distributors for distributing the received series of data from said plurality of directive antennas;
  - a receiving system change-over means having a plurality of channels for selecting a channel in which a maximum reception level can be obtained;
  - a receiver for extracting the data blocks and the receiving system change-over flags from the received series of data;
  - a change-over clock pulse producing means for producing a change-over clock pulse having a period corresponding to the receiving system change-over flags; and
  - a level comparator for monitoring, comparing, storing, and detecting reception levels of the received series of data distributed by said plurality of distributors, said level comparator comprising:
    - a multiplexer having a plurality of channels for changing over channels from one to another;
    - an amplifier for amplifying the received series of data;
    - a detector for detecting an envelope of the amplified received series of data;
    - a converter for converting the enveloped detected series of data to a digital signal;
    - a CPU for controlling the operation; and
    - a memory for storing the digital signal.

9. A diversity antenna communication system as claimed in claim 8, wherein said CPU continuously monitors said channels of said multiplexer, changes over channels every predetermined period, and supplies a change-over control signal to said receiving system change-over means on the change-over clock pulse upon detection of a higher maximum reception level in one of said channels of said multiplexer to change-over said channels of said receiving systems change-over means to obtain a higher maximum reception level.

10. A diversity signal receiving apparatus comprising:
- plural receiving systems for receiving a series of signals;
- at least one receiver for receiving and demodulating the series of signals outputted from said plural receiving systems;
- receiving level setting means for selectively lowering, in response to a receiving changeover signal, the signal reception level of a first of said receiving systems of a second of said receiving systems used for actual signal reception by a prescribed level;
- receiving system detecting means for monitoring and comparing the signal reception levels of said signals output from said first and second receiving systems to detect the receiving system providing the maximum reception level;
- receiving system change-over means for switching the present receiving system used for actual signal reception to the signal receiving system providing the maximum reception level and for outputting said receiving system changeover signal to said receiving level setting means, thereby lowering the signal reception level of the other of said first or second receiving systems which does not provide the maximum reception level; and
- wherein said receiving system detecting means comprises level monitoring means for detecting the envelope of the series of signals from said plural receiving systems and extracting the reception level thereof, and level comparing means for comparing said reception levels of said series of signals from said level monitoring means to output a receiving system change-over signal to said receiving system change-over means.

11. A diversity signal receiving apparatus as claimed in claim 10, wherein each of said plural receiving systems comprises an antenna for receiving the series of signals and a distributor for distributing the series of signals from said antenna to said receiving system change-over means and said receiving system detecting means.

12. A diversity signal receiving apparatus comprising:
- plural receiving systems for receiving a series of signals;
- at least one receiver for receiving and demodulating the series of signals outputted from said plural receiving systems;

receiving level setting means for selectively lowering, in response to a receiving changeover signal, the signal reception level of a first of said receiving systems or a second of said receiving systems used for actual signal reception by a prescribed level;

receiving system detecting means for monitoring and comparing the signal reception levels of said signals output from said first and second receiving systems to detect the receiving system providing the maximum reception level;

receiving system change-over means for switching the present receiving system used for actual signal reception to the signal receiving system providing the maximum reception level and for outputting said receiving system changeover signal to said receiving level setting means, thereby lowering the signal reception level of the other of said first or second receiving systems which does not provide the maximum reception level; and wherein said receiving level setting means comprises a dummy resistor having a lower impedance than an equivalent resistance of said receiver.

13. A diversity signal receiving apparatus comprising:

plural receiving systems for receiving a series of signals;

at least one receiver for receiving and demodulating the series of signals outputted from said plural receiving systems;

receiving level setting means for selectively lowering, in response to a receiving changeover signal, the signal reception level of a first of said receiving systems or a second of said receiving systems used for actual signal reception by a prescribed level;

receiving system detecting means for monitoring and comparing the signal reception levels of said signals output from said first and second receiving systems to detect the receiving system providing the maximum reception level;

receiving system change-over means for switching the present receiving system used for actual signal reception to the signal receiving system providing the maximum reception level and for outputting said receiving system changeover signal to said receiving level setting means, thereby lowering the signal reception level of the other of said first or second receiving systems which does not provide the maximum reception level; and wherein said prescribed level is determined to the extent that deep fading can be detected.

14. A diversity signal receiving apparatus comprising:

plural receiving systems for receiving the series of signals;

at least one receiver for receiving and demodulating the series of signals outputted from said plural receiving systems;

receiving system detecting means for monitoring and comparing the signal reception levels of said plural receiving systems to detect the alternation time of the maximum reception level in said plural receiving systems;

reception level setting means for setting the upper threshold level and the lower threshold level for a signal reception level at the alternation time and outputting a receiving system change-over signal when the signal reception level of the present receiving system used for actual signal reception is lower than said lower threshold level and when the signal reception level of a signal receiving system providing the maximum reception level exceeds said upper threshold level; and receiving system change-over means for switching said present receiving system to said receiving system providing the maximum reception level in response to said receiving system change-over signal.

15. A diversity signal receiving apparatus as claimed in claim 14, wherein each of said plural receiving systems comprises an antenna for receiving the series of signals and a distributor for distributing the series of signals from said antenna to said receiving system change-over means and said receiving system detecting means.

16. A diversity signal receiving apparatus as claimed in claim 14, wherein said upper and lower threshold levels are determined to the extent that deep fading can be detected.

17. A diversity antenna communication system comprising:

a transmitter for transmitting a series of signals;

a diversity signal receiving apparatus comprising:

plural receiving systems for receiving a series of signals, at least one receiver for receiving and demodulating the series of signals output from said plural receiving systems, reception level setting means for lowering the signal reception level of first receiving systems other than a second receiving system of said receiving systems used for actual signal reception by a prescribed level, receiving system detecting means for monitoring and comparing the signal reception levels of said first and second receiving systems to detect a receiving system providing the maximum reception level and outputting a change-over signal in accordance therewith, and receiving system change-over means for switching the present receiving system used for actual signal reception to the signal receiving system providing the maximum reception level in response to said change-over signal; and transmission and reception change-over means for switching a connection between said receiver and said receiving systems to that between said transmitter and said receiving systems to thereby connect said transmitter to the receiving system providing the maximum reception level and transmit the series of signals using said receiving system providing the maximum reception level.

18. A diversity antenna communication system comprising:

a transmitter for transmitting a series of signals;

a diversity signal receiving apparatus comprising:

plural receiving systems for receiving a series of signals, at least one receiver for receiving and demodulating series of signals outputted from said plural receiving system, receiving system detecting means for monitoring and comparing signal reception levels of said plural receiving systems to detect an alternation time of a maximum reception level in said plural receiving systems, reception level setting means for setting an upper threshold level and a lower threshold level for a signal reception level at the alternation time, said reception level setting means outputting a receiving system change-over signal when the signal reception level of a present receiving system used for actual signal reception is lower than said lower threshold level and when the signal reception level of a signal receiving system providing the maximum reception level exceeds said upper threshold level, and receiving system change-over means for switching said present receiving system to said receiving system providing the maximum reception level in response to said receiving system change-over signal; and transmission and reception change-over means for switching a connection between said receiver and said receiving system to that between said transmitter and said receiving systems to thereby connect said transmitter to the receiving system providing the maximum reception level, and to transmit the series of signals using said receiving system providing the maximum reception level.

19. A diversity antenna communication system as claimed in any one of claims 1, 17 and 18, wherein a receiving system providing the minimum reception level in said plural receiving systems is interrupted and the remaining receiving systems are used for signal transmission and reception.

20. A diversity signal receiving apparatus as claimed in claim 12, wherein each of said plural receiving systems comprises an antenna for receiving the series of signals and a distributor for distributing the series of signals from said antenna to said receiving system change-over means and said receiving system detecting means.

21. A diversity signal receiving apparatus as claimed in claim 13, wherein each of said plural receiving systems comprises an antenna for receiving the series of signals and a distributor for distributing the series of signals from said antenna to said receiving system change-over means and said receiving system detecting means.

* * * * *